Oct. 12, 1943.     S. J. KOCH     2,331,401
MAKING CATHODE RAY TUBE GUN STRUCTURE
Filed May 29, 1942
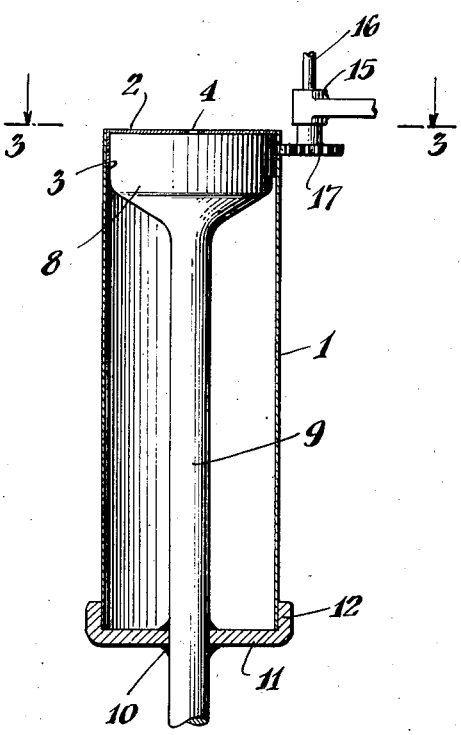
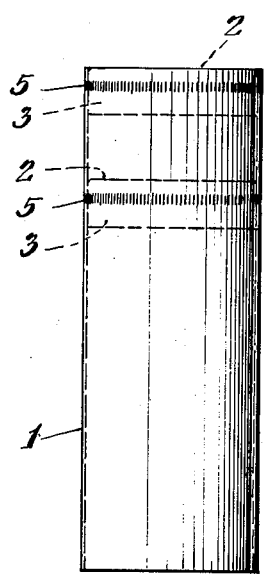
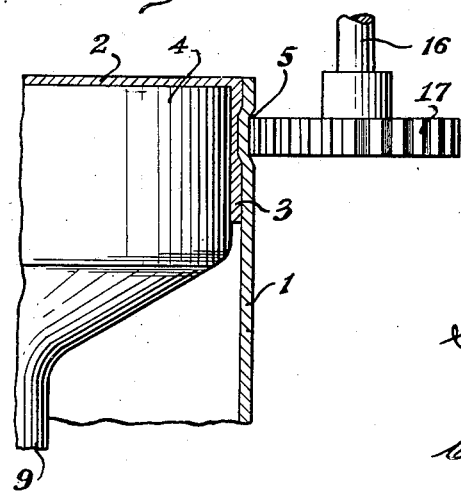
Fig. 1
Fig. 2
Fig. 3
Fig. 4
Stanley J. Koch, INVENTOR.
BY
Charles W. Mortimer,
ATTORNEY Patented Oct. 12, 1943

2,331,401

UNITED STATES PATENT OFFICE 2,331,401

MAKING CATHODE RAY TUBE GUN STRUCTURES

Stanley J. Koch, Clifton, N. J., assignor to Allen B. Du Mont Laboratories, Inc., Passaic, N. J., a corporation of Delaware Application May 29, 1942, Serial No. 444,959

10 Claims. (Cl. 250—27.5)

This invention relates to the production of an anode that constitutes a portion of the gun structure of a cathode ray tube.

Heretofore such anodes have been made, for example, by attaching a flanged disc, that has an aperture at the center, to the open end of a cylindrical member by spot welding at intervals around the circumference while the flanged disc and cylinder to which it is to be attached were in assembled relation.

It is very important that the parts of anodes be correctly assembled so that no distortion causing dissymmetry or lack of alignment shall appear. The surface of the disc, or the apertured end of the completed anode, should be exactly perpendicular to the axis of the cylinder and the center of the aperture should be exactly at the axis of the cylinder.

It has been found, however, with the previous practice of spot welding, that it is very difficult to keep the parts in exactly correct relation to each other during the spot welding operation due to heat expansion and other causes so that the anodes are often so imperfectly formed that they are not suitable for use or do not perform satisfactorily.

By the present invention it has been found that anodes can be produced more rapidly with less expense and care than heretofore and at the same time there are far less rejects due to imperfections.

The invention will be understood from the description in connection with the accompanying drawing, in which:

Fig. 1 is a side view of an anode;

Fig. 2 is a section showing an anode in course of production;

Fig. 3 is a plan view partly in section along the line 3—3 of Fig. 2; and

Fig. 4 is a portion of the upper right hand corner of Fig. 3 on an enlarged scale.

In the drawing, reference character 1 indicates the cylindrical portion of the anode to which the disc 2 having a flange 3 and aperture 4 is to be attached.

The method of attachment of the disc 2 to the cylinder 1 is by pressing a circular series of short axially extending depressions 5 into the outside of the cylinder 1 in such a way that the pressed-in metal forms corresponding indentations in the flange 2 of the disc 1 while this flange is supported from springing inwardly and is also kept from being skewed out of perpendicular to the axis of the cylinder 1.

While the depressions 5 are being formed the flange 3 is held so that its outer surface will be slightly indented corresponding to the depressions 5 and the disc 2 is kept perpendicular with the axis of the cylinder 1. For this purpose the circular head 8, having a shaft 9, fits into the flange 3. The flat face of the head 8 is exactly perpendicular to the shaft 9 and this shaft is securely and rigidly attached as shown at 10 to a disc 11 having a flange 12 fitting the outside of the cylinder 1 so that when the disc 2 rests upon the head 8 it is kept in exact position while it is being attached to the cylinder 1.

The attachment of the disc 2 to the cylinder 1 by means of indentations 5 may be accomplished by supporting in a bearing 15 a shaft 16 carrying a wheel with hardened teeth 17. While the shaft 9 and head 8 hold the disc 2 and cylinder 1, the wheel 17 is pressed against the cylinder as shown in Figs. 2 and 3 and pressure is applied while the wheel 17 is carried around in a planetary motion or the cylinder 1 is revolved on its own axis while pressure of the wheel 17 against it is maintained.

One or more additional flanged discs 2 may be attached in a similar manner as indicated in Fig. 1, and the spacing between these discs may be made whatever is desired when they are secured in place and all misalignment due to heat expansion by welding is avoided.

It has been found that the metal of the indentations 5 on the cylinder 1 firmly and securely retains the disc 2 in place either by pressure engagement of the short inside ribs, formed by making the indentation, with the outside surface of the flange 3 or by slight penetration of these ribs into this flange.

What is claimed is:

1. The process of making an element for a vacuum tube, which comprises assembling a flanged disc and a cylinder, and indenting the surface of the cylinder opposite the flange and only between said disc and the edge of its flange while keeping the inside portion of the flange of said disc smooth and cylindrical.

2. The process of making an anode, which comprises assembling a flange disc and a cylinder, and indenting the surface of the cylinder opposite the flange and only between said disc and the edge of its flange at intervals substantially all the way around the cylinder while keeping the inside portion of the flange of said disc smooth and cylindrical.

3. The process of making an anode, which comprises assembling a flanged disc and a cylinder, and indenting the surface of the cylinder opposite the flange and only between said disc and the edge of its flange while supporting the flange of said disc so as to resist the thrust and preventing distortion of the inside thereof.

4. The process of making an anode, which comprises assembling a flange disc and a cylinder, and indenting the surface of the cylinder opposite the flange and only between said disc and the edge of its flange and preventing distortion of the inside thereof while keeping said disc at right angles to the axis of said cylinder.

5. An anode comprising a cylinder and flanged disc, said cylinder having axially extending indentations contacting with the flange of said disc and said indentations terminating short of the near end of said cylinder.

6. An anode comprising a cylinder and flanged disc with the inside of the flange smooth and cylindrical, said cylinder having axially extending indentations contacting with the flange of said disc and terminating short of the ends of said flange.

7. An anode comprising a cylinder and flanged disc, said cylinder having axially extending indentations contacting with the flange of said disc and terminating short of the ends of said flange and terminating short of the near end of said cylinder with the inside of the flange smooth and cylindrical.

8. The process of making an anode, which comprises locating a cylinder with one end around a fixed head and the other end in a flange fixed with respect to said head, locating a flanged disc on said head with its flange between said head and cylinder, and indenting the surface of said cylinder opposite said flange sufficiently to indent the flange of said disc.

9. A portion of a vacuum tube mount, which comprises a cylinder and flanged disc near the end of said cylinder with the inside of the flange smooth and cylindrical, said cylinder having indentations contacting with the flange of said disc and said indentations terminating short of the near end of said cylinder.

10. An anode comprising a cylinder and flanged disc with the inside of the flange smooth and cylindrical, said cylinder having indentations contacting with the flange of said disc and said indentations terminating short of the near end of said cylinder.

STANLEY J. KOCH.

CERTIFICATE OF CORRECTION.

Patent No. 2,331,401.   October 12, 1943.

STANLEY J. KOCH.

It is hereby certified that error appears in the printed specification of the above numbered patent requiring correction as follows: Page 1, second column, line 46, and page 2, first column, line 6, claims 2 and 4 respectively, for the word "flange" read --flanged--; page 2, second column, lines 2 and 3, claim 7, strike out "with the inside of the flange smooth and cylindrical" and insert the same after "disc" and before the comma, same page, first column, lines 13 and 24, claims 5 and 7 respectively: and that the said Letters Patent should be read with this correction therein that the same may conform to the record of the case in the Patent Office.

Signed and sealed this 14th day of December, A. D. 1943.

(Seal)

Henry Van Arsdale,
Acting Commissioner of Patents.